US008504589B2

(12) United States Patent
Cubranic (10) Patent No.: US 8,504,589 B2
(45) Date of Patent: Aug. 6, 2013

(54) CATEGORICAL FILTERING OF DATA

(75) Inventor: Davor Cubranic, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 13/465,922

(22) Filed: May 7, 2012

(65) Prior Publication Data

US 2012/0221575 A1  Aug. 30, 2012

Related U.S. Application Data

(60) Division of application No. 12/347,593, filed on Dec. 31, 2008, now Pat. No. 8,195,695, which is a continuation of application No. 11/555,234, filed on Oct. 31, 2006, now Pat. No. 7,493,330.

(51) Int. Cl.
*G06F 17/30* (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

| 6,912,527 | B2 | 6/2005 | Shimano et al. |
| 2002/0143761 | A1 | 10/2002 | Shimano et al. |
| 2005/0049992 | A1 | 3/2005 | Gupta |
| 2007/0156678 | A1 | 7/2007 | Ashkenazi et al. |
| 2007/0208693 | A1 * | 9/2007 | Chang et al. ...................... 707/2 |

FOREIGN PATENT DOCUMENTS

| JP | 2002-304626 A | 10/2002 |
| WO | WO-99/62006 A1 | 12/1999 |
| WO | WO-02/44942 A1 | 6/2002 |
| WO | WO-2006/037613 A3 | 8/2006 |

OTHER PUBLICATIONS

Canadian Intellectual Property Office Action, Application No. 2667774,Examiner's Report, dated Sep. 26, 2012.
European Patent Office, EP07863617.2-2201, European Search Report, 12 pages.
International Preliminary Report of Patentability and Search Report, PCT/US2007/082871, May 5, 2009, 5 pages.
Greene S, et al., "The end of zero-hit queries: query previews for NASA's Global Change Master Directory", International Journal on Digital Libraries, Heidelberg, De LNKD-DOI:10.2007/S007990050039, vol. 2, Sep. 1, 1999, pp. 79-90, XP002225651, ISSN: 1432-5012.
Yang & J O Pedersen Y: "A Comparative Study on Feature Selection in Text Categorization", Machine Learning, Proceedings of the International Conference, (ICML '97), Jul. 8, 1997, page COMPLETE, XP002119806.

* cited by examiner

*Primary Examiner* — Isaac M Woo
(74) *Attorney, Agent, or Firm* — Mintz, Levin, Cohn, Ferris, Glovsky and Popeo, P.C.

(57) ABSTRACT

A computer readable storage medium includes executable instructions to retrieve a dataset from a data source, where the dataset includes a first set of categories. A data structure that represents the dataset is built. A first set of merit values for the first set of categories is calculated. The first set of categories is ordered based on a criterion. The first set of categories is returned.

19 Claims, 7 Drawing Sheets

CATEGORICAL FILTERING OF DATA

CROSS REFERENCE TO RELATED APPLICATIONS

This application is a Divisional of patent application Ser. No. 12/347,593, filed on Dec. 31, 2008, which is a continuation of patent application Ser. No. 11/555,234, filed Oct. 31, 2006, now U.S. Pat. No. 7,493,330 issued Feb. 17, 2009, which is related to commonly owned U.S. patent application Ser. No. 11/555,206 filed Oct. 31, 2006, now U.S. Pat. No. 7,912,875 issued Mar. 22, 2011, the contents of each of the three applications are hereby fully incorporated by reference.

BRIEF DESCRIPTION OF THE INVENTION

This invention relates generally to filtering data. More particularly, this invention relates to determining filtering categories that will filter data efficiently.

BACKGROUND OF THE INVENTION

Large datasets with large numbers of associated categories are difficult to navigate quickly. In some cases, filtering on certain categories will only eliminate one or two records from the dataset. Prior art techniques generally provide a list of categories and attributes to filter on without indicating or determining how the filters will affect the resulting dataset. In many cases, the prior art provides a pre-determined hierarchy of categories to which records are indexed.

In view of the foregoing, it would be highly desirable to provide enhanced techniques for determining which categories will filter data efficiently.

SUMMARY OF INVENTION

The invention includes a computer readable storage medium with executable instructions to retrieve a dataset from a data source, where the dataset includes a first set of categories. A data structure that represents the dataset is built. A first set of merit values for the first set of categories is calculated. The first set of categories is ordered based on a criterion. The first set of categories is returned.

The invention also includes a computer readable storage medium with executable instructions to retrieve a dataset from a data source. The dataset is reordered by successively grouping on each category in a first set of categories. An enumeration tree is built, A set of merit values for the first set of categories is calculated. A second set of categories is determined, where the merit values meet a criterion. The second set of categories is returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

An attribute is any non-null value in a dataset.

An attribute combination is a set or subset of attributes associated with a particular record in a dataset.

An attribute count is the number of times that a distinct attribute appears in a single category.

An attribute count data structure is a data structure (e.g., a temporary reference table, a list, a hash table, or a tree) that stores the attribute counts for all attributes in a dataset. This data structure is an optional component of the categorical filtering process described within.

A category comprises a group of correlated attributes. A category is defined by similar locations of attributes in a data source. For example, a category is a column in a database table or spreadsheet, a set of fields sharing the same tag in an XML file, or a set of fields with a shared relative location within a hierarchical data source.

Common leading attributes are the set of attributes shared between two records that come before the first differentiating attribute in the category order.

Entropy is a measure from information theory. It describes how attributes in a category are distributed. This well known measure is related to the randomness of the distribution of the attributes.

An enumeration tree is a data structure with nodes connected by edges. An enumeration tree may represent a dataset with data and metadata obtained from a dataset.

A filter comprises one or more attributes belonging to the same category that have been specified as the required value(s) for that category.

Merit value or merit is a measure of how efficient a category is in filtering data.

A nodal attribute count is a count stored in an enumeration tree node that tracks how many times an attribute appears at the end of the preceding sequence of parent node attributes in a dataset. All nodal attribute counts for a given attribute sum to the associated attribute count.

Figure 1:
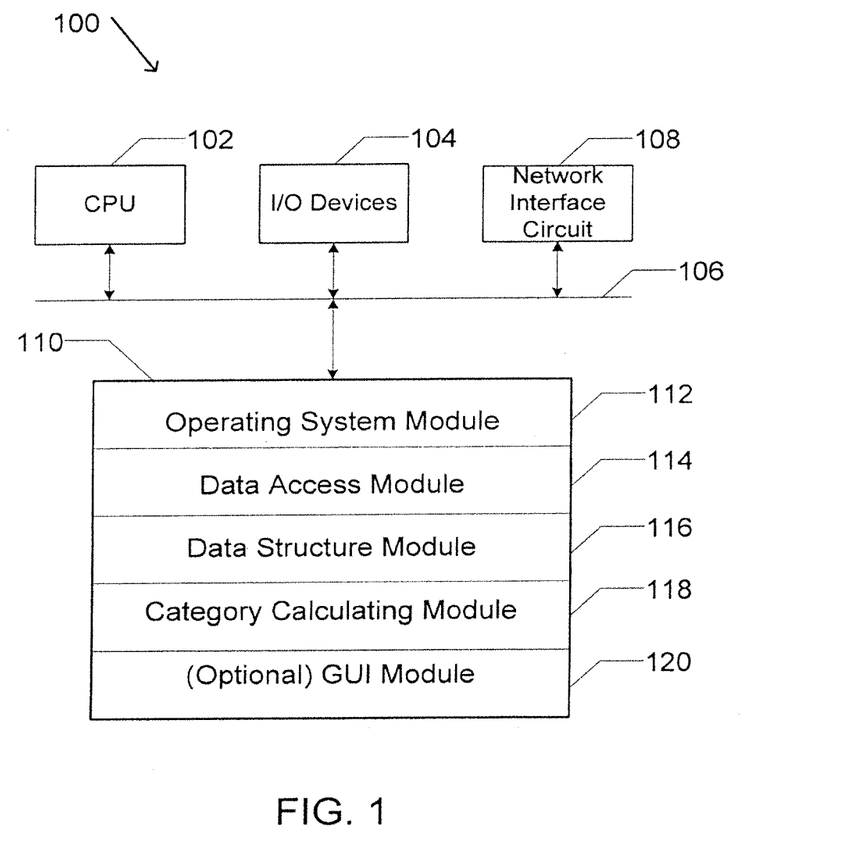
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit 108 provides connectivity to a network (not shown), thereby allowing the computer 100 to operate in a networked environment.

A memory 110 is also connected to the bus 106. The memory 110 stores executable instructions to implement operations of the invention. In an embodiment, the executable instructions include one or more of the following modules: an operating system module 112, a data access module 114, a data structure module 116, a category calculating module 118 and an optional Graphical User Interface (GUI) module 120.

The operating system module 112 includes executable instructions to handle various system services, such as file services or to perform hardware dependant tasks.

The data access module 114 includes executable instructions to modify a data source query (e.g., a Structured Query Language (SQL) query, a MultiDimensional eXpressions (MDX) query, a Data Mining Extensions (DMX) query) to include specified filters. The data access module 114 also includes executable instructions to apply the generated data source query to an underlying data source, which may form a portion of computer 100 or may be accessed as a separate networked machine through the network interface circuit 108.

The data structure module 116 includes executable instructions to build an enumeration tree data structure. This module also includes instructions to parse the enumeration tree in accordance with an embodiment of the invention.

The category calculating module 118 includes executable instructions to determine the categories that will efficiently filter the dataset and to organize the category information. In an embodiment, the category information is passed to the GUI module 120. In another embodiment, the category information is passed to another process.

The GUI module 120 is an optional component and may rely upon standard techniques to produce graphical components of a user interface, e.g., windows, icons, buttons, menu and the like. The GUI module 120 displays the successive sets of filtering categories, the filtered dataset results and the like to the user.

The executable modules stored in memory 110 are exemplary. It should be appreciated that the functions of the modules may be combined. In addition, the functions of the modules need not be performed on a single machine. Instead, the functions may be distributed across a network, if desired, Indeed, the invention is commonly implemented in a client-server environment with various components being implemented at the client-side and/or the server-side. It is the functions of the invention that are significant, not where they are performed or the specific manner in which they are performed.

Figure 2:
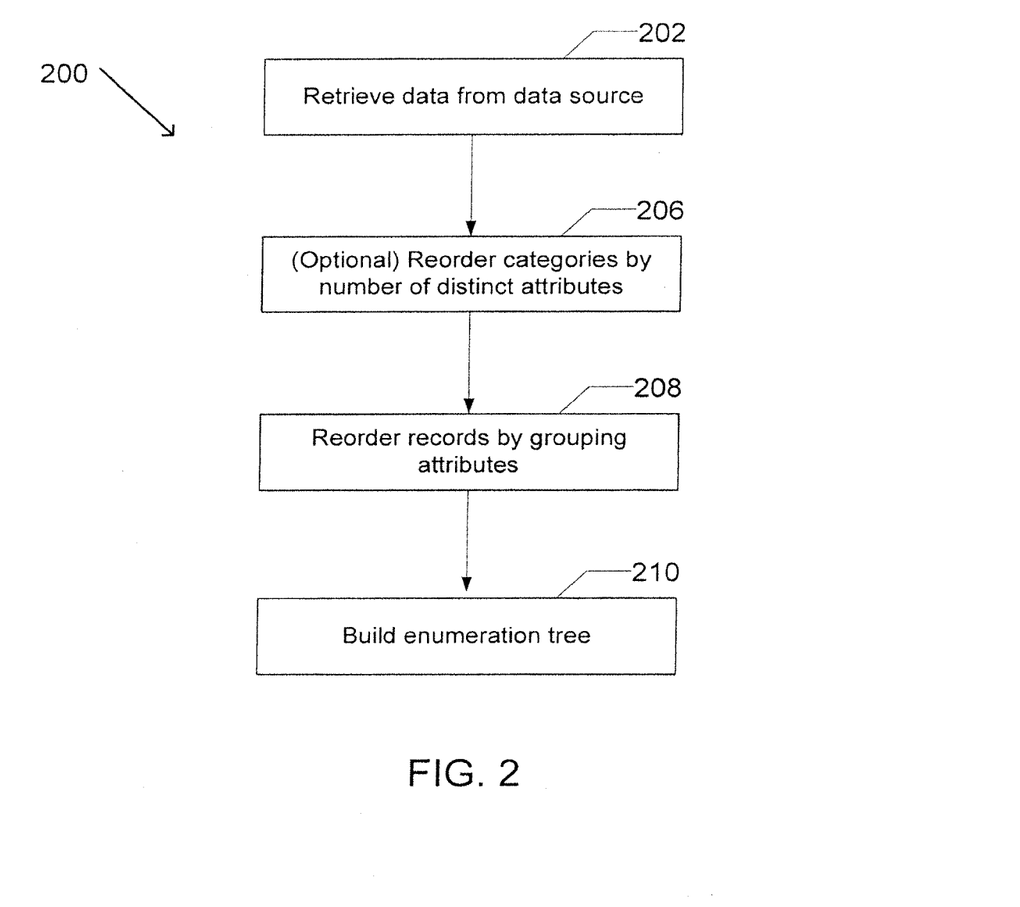
FIG. 2 illustrates processing operations for building the required enumeration tree data structure associated with an embodiment of the invention.

FIG. 2 illustrates processing operations 200 for building the enumeration tree data structure that may be implemented by the computer 100 while executing instructions from the data access module 114 or the data structure module 116. In the first processing operation of FIG. 2, the data access module retrieves a dataset from the data source 202 and optionally stores it in a temporary table.

In one embodiment, the data structure module 116 then optionally reorders the categories in an ascending order of number of distinct attributes 206. In an embodiment, if multiple categories have the same number of distinct attributes, they are grouped in their original order. Note that the categories need not be physically reordered. In an embodiment, it is determined whether it is more efficient to physically reorder the categories or number them so they appear to be reordered in interactions with the data access module 114. This is an optional operation; no operation in the process is dependent on this operation 206.

The next processing operation is to reorder the records by grouping the attributes in a descending order 208. The data structure module 116 begins by grouping on the lead category and progressing through the order.

Once this restructuring is complete, the data structure module 116 builds the enumeration tree 210. The data structure is tree-based, consisting of a single tree or a plurality of trees; one root node exists for each distinct attribute in the lead category.

The data structure module 116 begins by selecting the leading category attribute of the first record and sets it as the root node attribute. In one embodiment, the nodes of the enumeration tree contain an attribute, an ID for the parent node and a nodal attribute count. The remainder of the record is added to the tree as a series of nodes—one for each attribute—creating a single branch. The data structure module 116 tracks the last record added to the enumeration tree. This record information is used in adding subsequent records to the enumeration tree.

Figure 3:
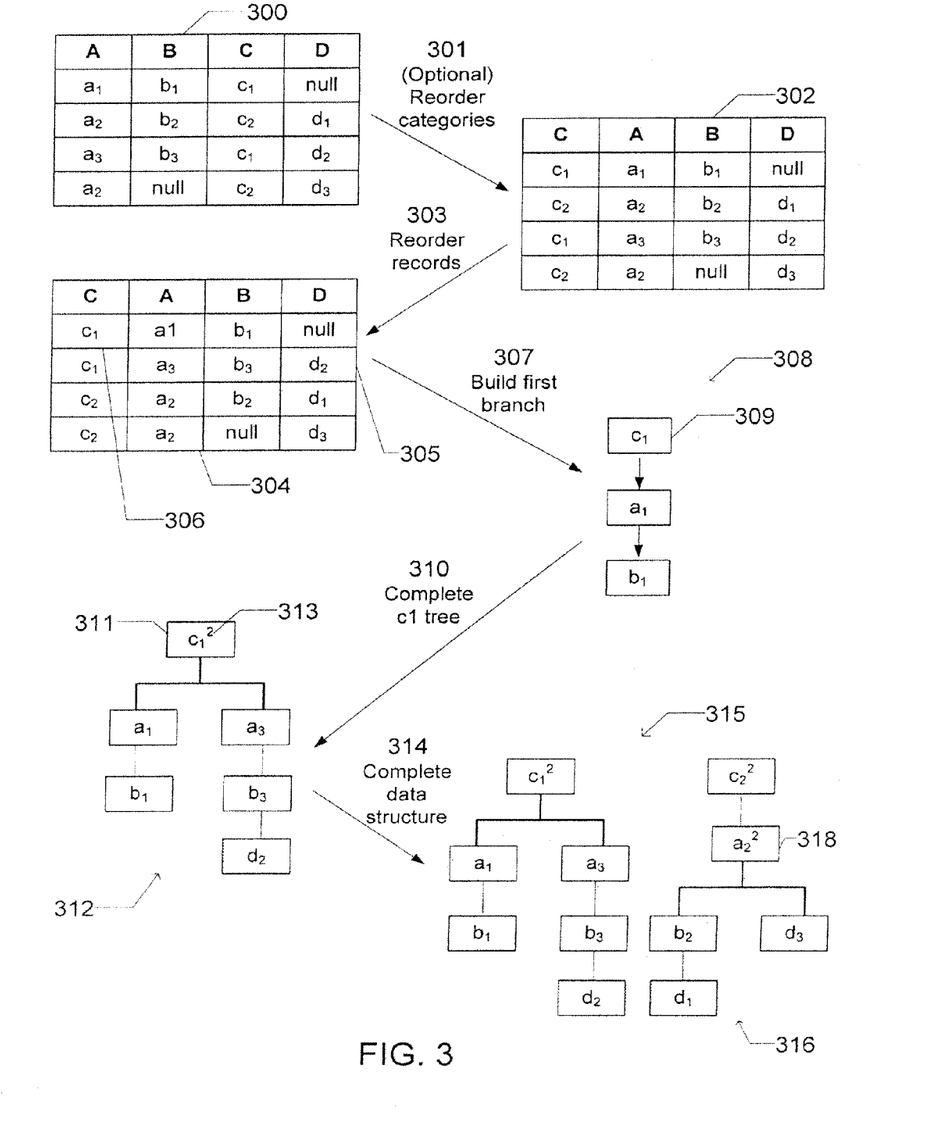
FIG. 3 illustrates the conversion of a dataset into the enumeration tree data structure in accordance with an embodiment of the invention.

To add more records to the enumeration tree, the data structure module 116 selects the next record in the dataset. This record is compared to the previously added record to check for common leading attributes. All common leading attributes share the same node, much like in a prefix tree, and a nodal attribute count tracks how many records are sharing a single node, The remaining attributes of the record are added as a sub-branch beginning at the node of the last common leading attribute. If there are no common leading attributes for a record and the previously added record, then a new root node is created. Note that null values are not stored in the enumeration tree. Records with null values in the leading category select their root node attribute from the first category with a non-null value FIG. 3 illustrates the process of building the enumeration tree one embodiment of the invention based on the example dataset in the table 300. First, the columns of the table 300 are optionally reordered based on the number of distinct attributes 301. Next, the records of the resulting table 302 are reordered by grouping the attributes 303. Then the resulting table 304 is used to build the enumeration tree 315.

The data structure module 116 selects the first attribute 306 from the leftmost column of the temporary table 304 and sets it as the root node 309. The first branch of the enumeration tree is created 307 resulting in the tree 308. Note that null values are not stored in the enumeration tree.

From there, a branch is created for each further record with the root node 309 attribute $c_1$ in its leftmost column, 310. The record 305 is compared to the previously added record to determine the common leading attributes. The nodes of the common leading attributes, in this case attribute c1 and node 311, are shared. The nodal attribute count, depicted as a superscript (e.g., 313), is incremented by 1. And, as illustrated, the remainder of record 305 is stored as a sub-branch in the enumeration tree 312.

The remainder of the data structure 315 is created by repeating this process for the remaining distinct attributes of the leftmost column 314. This completes the enumeration tree 316. As previously mentioned, all common leading attributes use the same node, hence the shared node 318.

Figure 4:
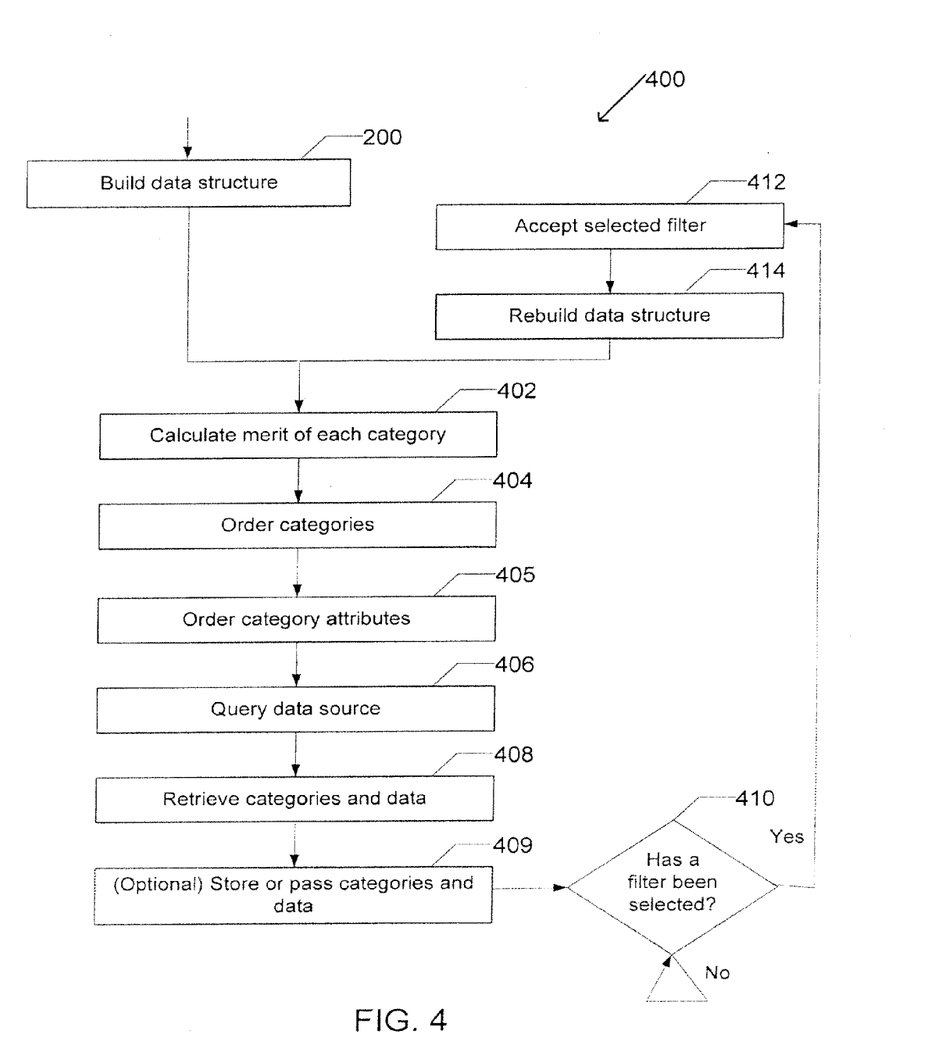
FIG. 4 illustrates processing operations for determining a set of categorical filtering options in accordance with a general embodiment of the invention.

FIG. 4 illustrates processing operations 400 for determining a set of categorical filtering options that may be implemented by the computer 100 in a general embodiment, while executing instructions from the data access module 114, the data structure module 116 or the category calculating module 118. As illustrated, the process continues from the enumeration tree data structure building process 200 of FIG. 2. The next operation is to use a predetermined formula and process to calculate the merit of each category 402. The categories are then ordered 404 and the attributes of each category are ordered 405.

In one embodiment, the categories are ordered by ascending merit and in another embodiment, by descending merit. In one embodiment, the categories are ordered by merit and another value derived from the data or associated metadata. In one embodiment, the category attributes are ordered by ascending frequency and in another embodiment, descending frequency. Other embodiments include, but are not limited to, ordering category attributes alphabetically, numerically, according to a user specification submitted via the GUI module 120 or leaving the attributes unordered.

The application then queries the data source 406 using the specified filters and retrieves the applicable dataset and categories 408. The application can then optionally store the dataset and categories or pass them on to another process or the GUI module 120, 409. The application may pass on any subset of the original set of categories. This subset may be based on a criterion set by the data structure module 116 (e.g., highest merit, lowest merit, closest to a target value), a similar criterion specified by the GUI module 120 or a request from the user.

The computer 100 waits for the user, or another agent, to select a filter 410. If a filter is selected (410—Yes), then the category calculating module 118 accepts the filter 412 and rebuilds the enumeration tree 414. In rebuilding the enumeration tree, the data structure module 116 copies the branches with an attribute of the selected filter in the associated category from the current enumeration tree. The process then cycles through operations 402 through 409 again, this time querying for a filtered dataset during operation 406 using the specified filter. If the filter is made up of more than one attribute, then an "or" statement is used in the query. If a filter is not selected (410—No), then the process stops until one is selected.

Figure 5:
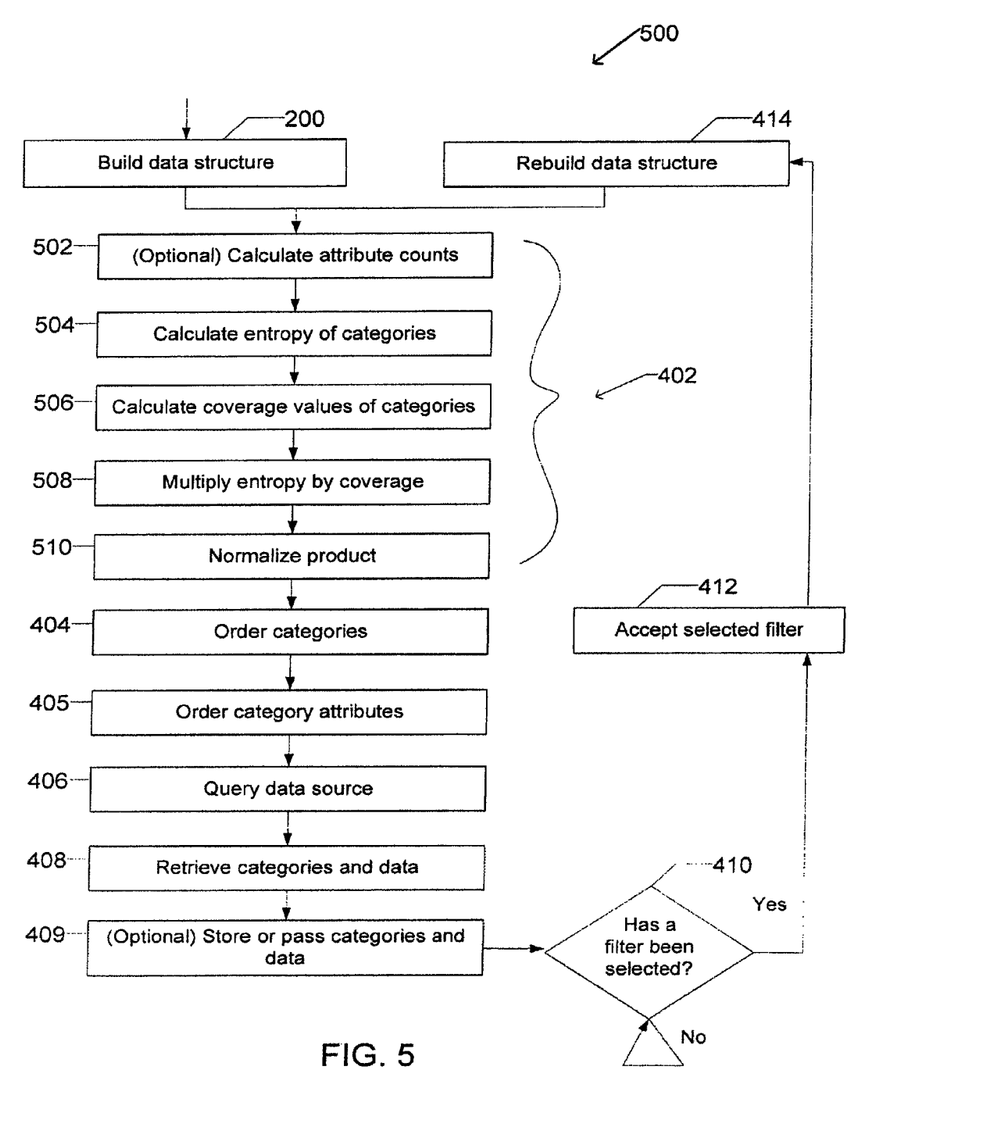
FIG. 5 illustrates processing operations for determining a set of categorical filtering options in accordance with a specific embodiment of the invention.

FIG. 5 illustrates processing operations 500 for determining a set of categorical filtering options that may be implemented by the computer 100 in a specific embodiment of the invention, while executing instructions from the data access module 114, the data structure module 116 or the category calculating module 118. FIG. 5 illustrates processing operations associated with an alternative embodiment of the invention. Many of these operations were already discussed in connection with FIG. 4. Therefore, only the new operations will be discussed.

The first sub-operation 502, to calculate the attribute counts, of calculating merit is optional. In an embodiment, to calculate the attribute counts 502 the data structure module 116 parses the enumeration tree while the category calculating module 118 sums the nodal attribute counts for each distinct node attribute. Calculating the attribute counts first provides a data structure (e.g., a temporary reference table, a list, a hash table, or a tree) for retrieval of a summary data for future calculations by the category calculating module 118. In another embodiment, this sub-operation is not performed and the category calculating module 118 requests that the data structure module 116 parse the enumeration tree to derive specific attribute counts every time one is required.

The next sub-operation is to calculate the entropy (E) of the categories 504 using an entropy formula, such as:

$$E = -K \sum_{i=1}^{n} p(cat_i) \cdot \log(p(cat_i))$$

where:
K is an optional constant;
n is the number of distinct attributes in the category;

log is the logarithm function, the base of which varies with different embodiments and may include the natural logarithm, common logarithm, binary logarithm or indefinite logarithms;

$cat_i$, is the $i^{th}$ distinct attribute in the category; and $p(cat_i,)$ is the probability that an attribute is $cat_i$, which is equivalent to the number of times $cat_i$ occurs divided by the number of records in the dataset. The values used to calculate $p(cat_i)$ are retrieved from the attribute count data structure constructed in the previous sub-operation 502 or derived from the enumeration tree when required.

The next sub-operation is to calculate category coverage 506. Category coverage is determined by the percentage of attributes in the category. In one embodiment, the category calculating module 118 retrieves the attribute counts from the attribute count data structure and the number of records in the dataset from the data source. In another embodiment, the attribute counts are derived from the enumeration tree. The category entropies are then multiplied by the corresponding category coverage values 508.

The next sub-operation is to normalize the product from the previous sub-operation 510. Normalization may be performed by dividing the entropy-coverage product by a normalizing value z that is correlated with n, the distinct number of attributes in the category. In one embodiment z is monotonic in n. In one embodiment where z is monotonic in n, z is super linear in n. In one embodiment where z is super linear in n, z is equal to nlog(n). Examples of the logarithm's base include 2, e (i.e., 2.718281828 where $\log_e$ is denoted ln) and 10. In one embodiment where z is monotonic in n, z is linear in n. In one embodiment where z is linear in n, z is equal to n. The value of n is determined from the attribute count data structure or from parsing the enumeration tree.

The result of normalization is the merit value (M). Note that the merit value is proportional to entropy and coverage, and inversely proportional to the number of distinct attributes in the category.

Figure 6:
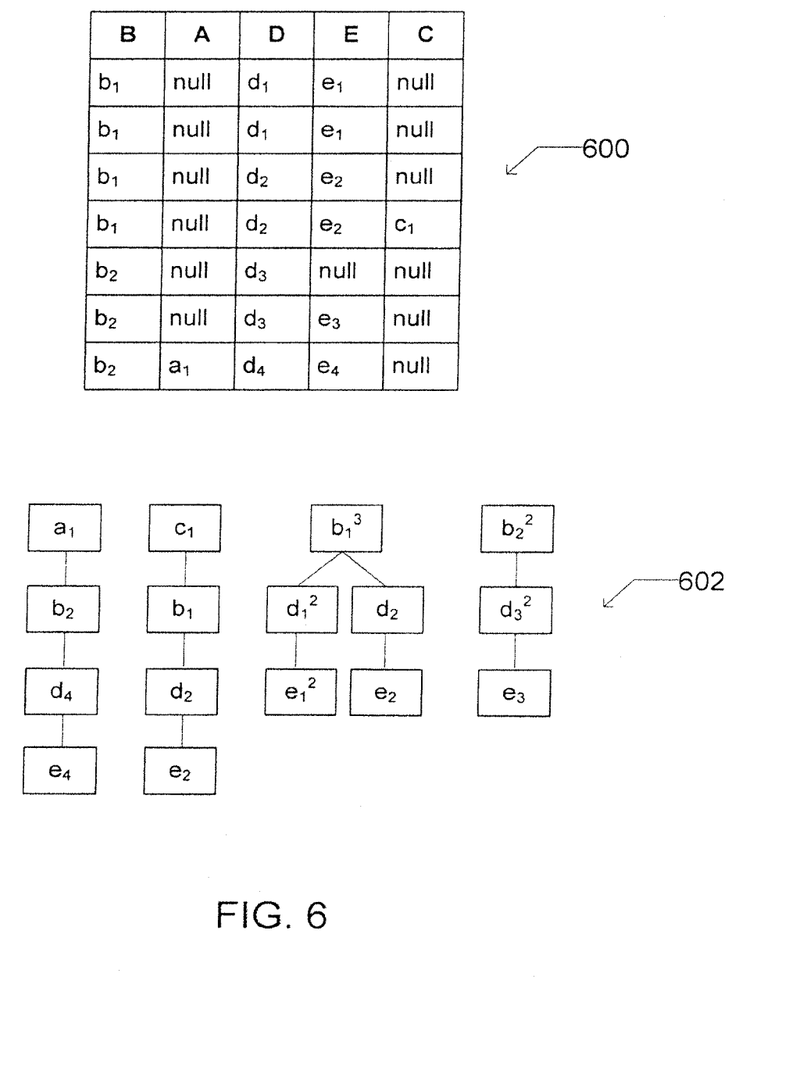
FIG. 6 illustrates a sample dataset and corresponding enumeration tree data structure configured in accordance with an embodiment of the invention.

FIG. 6 illustrates a sample dataset 600 to be used in the following example of the processing operations 500 of FIG. 5. The corresponding enumeration tree 602 was constructed per the processing operations 200 of FIG. 2.

After the data structure module 116 builds the enumeration tree, the category calculation module 118 takes over, periodically sending requests to the data structure module 116 to parse the enumeration tree for information. The first operation 502 is to calculate attribute counts. This operation 502 is optional. The attribute counts for the dataset 600 are:

| B | A | D | E | C |
|---|---|---|---|---|
| $\|b_1\| = 4$ | $\|a_1\| = 1$ | $\|d_1\| = 2$ | $\|e_1\| = 2$ | $\|c_1\| = 1$ |
| $\|b_2\| = 3$ | | $\|d_2\| = 2$ | $\|e_2\| = 2$ | |
| | | $\|d_3\| = 2$ | $\|e_3\| = 1$ | |
| | | $\|d_4\| = 1$ | $\|e_4\| = 1$ | |

Entropy values are then calculated as per operation 504:

$$E(B) = -(1)[(4/7)\ln(4/7) + (3/7)\ln(3/7)] = 0.683$$

$$E(A) = -(1)[(1/7)\ln(1/7)] = 0.278$$

$$E(D) = -(1)[(2/7)\ln(2/7) + (2/7)\ln(2/7) + (2/7)\ln(2/7) + (1/7)\ln(1/7)] = 1.352$$

$$E(E) = -(1)[(2/7)\ln(2/7) + (2/7)\ln(2/7) + (1/7)\ln(1/7) + (1/7)\ln(1/7)] = 1.272$$

$$E(C) = -(1)[(1/7)\ln(1/7)] = 0.278$$

The next operation is to calculate coverage values 506:

$$c(B)=7/7=1$$

$$c(A)=1/7=0.143$$

$$c(D)=7/7=1$$

$$c(E)=6/7=0.857$$

$$c(C)=1/7=0.143$$

Then the entropy and coverage values are multiplied 508:

$$E(B)*c(B)=0.683*1=0.683$$

$$E(A)*c(A)=0.278*0.143=0.0398$$

$$E(D)*c(D)=1.352*1=1.352$$

$$E(E)*c(E)=1.272*0.857=1.090$$

$$E(C)*c(C)=0.278*0.143=0.0398$$

The next operation is to normalize the products of the previous operation 510:

$$M(B)=[E(B)*c(B)]/n \ln(n)=0.683/(2*\ln 2)=0.493$$

$$M(A)=[E(A)*c(A)]/n \ln(n)=0.0398/(1*\ln 1)=\text{NaN}$$

$$M(D)=[E(D)*c(D)]/n \ln(n)=1.352/(4*\ln 4)=0.244$$

$$M(E)=[E(E)*c(E)]/n \ln(n)=1.090/(4*\ln 4)=0.196$$

$$M(C)=[E(C)*c(C)]/n \ln(n)=0.0398/(1*\ln 1)=\text{NaN}$$

Here, NaN denotes "not a number" and results from division by zero.

Then the categories are ordered 404, in this case by descending merit:
M(B)=0.493
M(D)=0.244
M(E)=0.196
M(A) NaN
M(C)=NaN Merit values of NaN are ranked after all other values. An aspect of using nln(n) as the normalizing value z is that categories with just one distinct attribute have a merit value of NaN.

The next operation, which is optional, is to order the attributes of each category 405 of FIG. 5, in this case by descending frequency:

| B | A | D | E | C |
|---|---|---|---|---|
| $b_1$ | $a_1$ | $d_1$ | $e_1$ | $c_1$ |
| $b_2$ |  | $d_2$ | $e_2$ |  |
|  |  | $d_3$ | $e_3$ |  |
|  |  | $d_4$ | $e_4$ |  |

The data access module 114 then queries the data source for the dataset 600, 406 of FIG. 5 and retrieves the applicable dataset and categories 408 of FIG. 5. The application then optionally stores the dataset and ordered categories or sends them to another process or to the GUI module 120, 409 of FIG. 5. In an embodiment, the GUI module 120 provides the user with categories that have merit values greater than zero. For example, in this case the GUI module 120 displays categories B, D and E. The process 500 then waits for another filter to he specified before continuing.

Figure 7:
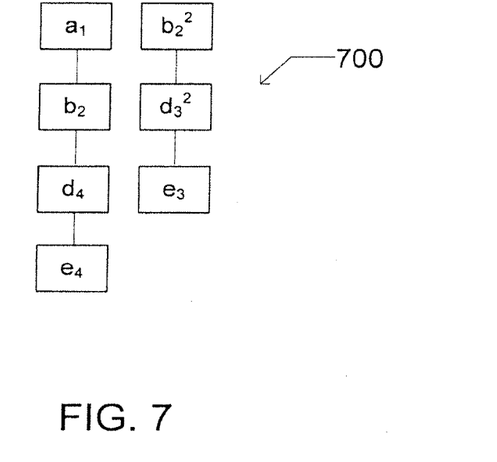
FIG. 7 illustrates the enumeration tree data structure of FIG. 6 after being reconstructed based on a supplied filter.

When a filter is selected, the data structure module 116 accepts that filter and rebuilds the enumeration tree by copying the relevant branches into a new enumeration tree. For example, if the selected filter is $B=b_2$, the enumeration tree 700 of FIG. 7 is created.

The category calculating module 118 then performs the set of processing operations 402 of FIG. 5, resulting in the following merit values:
M(A)=NaN
M(D)=0.459
M(E)=0.352
M(C)=NaN The categories are then ordered (404 of FIG. 5), in this case by descending merit:
M(D)=0.459
M(E)=0.352
M(A)=NaN
M(C)=NaN And the category attributes are optionally ordered (405 of FIG. 5), in this case by descending frequency:

| B | A | D | E | C |
|---|---|---|---|---|
| $b_2$ | $a_1$ | $d_3$ | $e_3$ |  |
|  |  | $d_4$ | $e_4$ |  |

The data access module 116 then queries the data source (406 of FIG. 5) for a new dataset filtering on $B=b_2$, and retrieves the applicable dataset and categories (408 of FIG. 5). The application then optionally stores a new set of ordered categories and the filtered dataset or sends them to another process or to the GUI module 120, (409 of FIG. 5). The process 500 waits for another filter to be specified before continuing.

The categories and dataset may be displayed by the GUI module 120 in accordance with any number of techniques, including those described in the following concurrently filed, commonly owned patent application, which is incorporated by reference herein in its entirety: "Apparatus and Method for Filtering Data Using Nested Panels", Application No. 11/555,206, filed Oct. 31, 2006.

Embodiments of the invention include a computer readable storage medium storing executable instructions. The computer readable storage medium includes instructions to retrieve a dataset from a data source. The dataset includes a set of records and a set of categories. The instructions include instructions to reorder the set of records by successively grouping on each category in the set of categories. The instructions include instructions to build an enumeration tree. In an embodiment, a category of the computer readable medium includes a set of attributes. In an embodiment, the computer readable medium additionally includes executable instructions to calculate a count of distinct attributes in each category in the set of categories and reorder the categories by ascending order of the count of distinct attributes. In an embodiment, the computer readable medium additionally includes executable instructions to accept a filter, copy a set of applicable branches from the enumeration tree, wherein an applicable branch of the set of applicable branches complies with the filter, and build a new enumeration tree using the set of applicable branches.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to he exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   receive a request for information about a data set;
   parse, in response to the request, an enumeration tree based on the data set to obtain the requested information; and
   return the requested information;
   wherein the enumeration tree comprises nodes connected by edges and is formed by:
      retrieving the data set with a set of records and a set of categories;
      reordering the data set by successively grouping the set of records in accordance with the set of categories;
      accepting a filter;
      copying a set of applicable branches from the enumeration tree, the set of applicable branches being specified by the filter; and
      modifying the enumeration tree with the set of applicable branches.

2. A computer readable storage medium as in claim 1, wherein each category includes a set of attributes.

3. A computer readable storage medium as in claim 2, wherein the enumeration tree is further formed by: calculating a count of distinct attributes in each category of the set of categories.

4. A computer readable storage medium as in claim 3, wherein the set of categories are reordered by ascending attribute count.

5. A computer readable storage medium as in claim 3, wherein the enumeration tree is further formed by calculating a first plurality of merit values, wherein each merit value is proportional to entropy of a category and coverage of the category and each merit value is inversely proportional to the number of distinct attributes of the category.

6. A computer readable storage medium as in claim 5, wherein the first plurality of merit values are calculated by:
   calculating entropy for each category in the first set of categories;
   calculating coverage for each category; and
   normalizing the product of the entropy and the coverage by dividing by a value proportional to the number of distinct attributes in each category.

7. A method for implementation by one or more data processors comprising:
   receiving, by at least one data processor, a request for information about a data set;
   parsing, by at least one data processor in response to the request, an enumeration tree based on the data set to obtain the requested information; and
   returning, by at least one data processor, the requested information;
   wherein the enumeration tree comprises nodes connected by edges and is formed by:
      retrieving the data set with a set of records and a set of categories;
      reordering the data set by successively grouping the set of records in accordance with the set of categories;
      accepting a filter;
      copying a set of applicable branches from the enumeration tree, the set of applicable branches being specified by the filter; and
      modifying the enumeration tree with the set of applicable branches.

8. A method as in claim 7, wherein each category includes a set of attributes.

9. A method as in claim 8, wherein the enumeration tree is further formed by:
   calculating, by at least one data processor, a count of distinct attributes in each category of the set of categories.

10. A method as in claim 9, wherein the set of categories are reordered by ascending attribute count.

11. A method as in claim 9, wherein the enumeration tree is further formed by calculating, by at least one data processor, a first plurality of merit values, wherein each merit value is proportional to entropy of a category and coverage of the category and each merit value is inversely proportional to the number of distinct attributes of the category.

12. A method as in claim 11, wherein the first plurality of merit values are calculated by:
   calculating, by at least one data processor, entropy for each category in the first set of categories;
   calculating, by at least one data processor, coverage for each category; and
   normalizing, by at least one data processor, the product of the entropy and the coverage by dividing by a value proportional to the number of distinct attributes in each category.

13. A method as in claim 7, wherein there are a plurality of data processors forming part of at least two computing systems.

14. A system comprising:
   at least one data processor; and
   memory storing instructions which when executed by the at least one data processor result in operations comprising:
      receiving a request for information about a data set;
      parsing an enumeration tree based on the data set to obtain the requested information; and
      returning the requested information;

wherein the enumeration tree comprises nodes connected by edges and is formed by:
retrieving the data set with a set of records and a set of categories;
reordering the data set by successively grouping the set of records in accordance with the set of categories;
accepting a filter;
copying a set of applicable branches from the enumeration tree, the set of applicable branches being specified by the filter; and
modifying the enumeration tree with the set of applicable branches.

15. A system as in claim 14, wherein each category includes a set of attributes.

16. A method as in claim 15, wherein the enumeration tree is further formed by:
calculating a count of distinct attributes in each category of the set of categories.

17. A method as in claim 16, wherein the set of categories are reordered by ascending attribute count.

18. A system as in claim 16, wherein the enumeration tree is further formed by calculating, by the at least one data processor, a first plurality of merit values, wherein each merit value is proportional to entropy of a category and coverage of the category and each merit value is inversely proportional to the number of distinct attributes of the category.

19. A system as in claim 18, wherein the first plurality of merit values are calculated by the at least one data processor by:
calculating entropy for each category in the first set of categories;
calculating coverage for each category; and
normalizing the product of the entropy and the coverage by dividing by a value proportional to the number of distinct attributes in each category.

* * * * *